(12) United States Patent
Jaljal et al.

(10) Patent No.: US 12,123,363 B2
(45) Date of Patent: Oct. 22, 2024

(54) METHOD FOR CONTROLLING A TURBOMACHINE COMPRISING AN ELECTRIC MACHINE

(71) Applicant: SAFRAN, Paris (FR)

(72) Inventors: Nawal Jaljal, Moissy-Cramayel (FR); Panagiotis Giannakakis, Moissy-Cramayel (FR)

(73) Assignee: SAFRAN, Paris (FR)

( * ) Notice: Subject to any disclaimer, the term of this patent is extended or adjusted under 35 U.S.C. 154(b) by 145 days.

(21) Appl. No.: 17/905,970

(22) PCT Filed: Mar. 2, 2021

(86) PCT No.: PCT/FR2021/050347
§ 371 (c)(1),
(2) Date: Sep. 9, 2022

(87) PCT Pub. No.: WO2021/181027
PCT Pub. Date: Sep. 16, 2021

(65) Prior Publication Data
US 2023/0103519 A1 Apr. 6, 2023

(30) Foreign Application Priority Data
Mar. 12, 2020 (FR) .................................... 2002447

(51) Int. Cl.
*F02C 9/56* (2006.01)
*F02C 7/36* (2006.01)
(52) U.S. Cl.
CPC .................. *F02C 9/56* (2013.01); *F02C 7/36* (2013.01); *F05D 2220/323* (2013.01);
(Continued)

(58) Field of Classification Search
CPC ......... F01D 15/10; B64D 27/10; B64D 27/24; B64D 27/026; F05D 2220/323; F05D 2220/76; F05D 2270/3032
See application file for complete search history.

(56) References Cited

U.S. PATENT DOCUMENTS

2014/0271117 A1    9/2014  Armstrong et al.

FOREIGN PATENT DOCUMENTS

WO    2020078720 A1    4/2020

OTHER PUBLICATIONS

French Search Report issued in French Application No. FR 2002447 on Nov. 4, 2020 (2 pages).
(Continued)

*Primary Examiner* — Ehud Gartenberg
*Assistant Examiner* — Roberto Toshiharu Igue
(74) *Attorney, Agent, or Firm* — Bookoff McAndrews, PLLC (57) ABSTRACT

The invention relates to a method for controlling a turbomachine comprising a gas generator, the turbomachine comprising an electric machine forming a device for injecting torque into/removing torque from one of the low pressure/high pressure rotation shafts of said gas generator. Said method comprises a step of implementing a fuel control loop in order to determine a fuel flow setpoint into the combustion chamber, and comprising, in the event that at least one operability limit is reached, determining a corrected fuel flow setpoint, said corrected fuel flow setpoint exhibiting a difference in relation to the setpoint. Said method also comprises a step of implementing a torque control loop in order to determine a torque setpoint for the electric machine, and comprising determining a torque correction quantity as a function of said difference, said torque setpoint being determined as a function of said torque correction quantity.

7 Claims, 3 Drawing Sheets

(52) U.S. Cl.
CPC .... *F05D 2220/76* (2013.01); *F05D 2270/042* (2013.01); *F05D 2270/052* (2013.01); *F05D 2270/101* (2013.01)

(56) References Cited

OTHER PUBLICATIONS

International Search Report issued in International Application No. PCT/FR2021/050347 on May 28, 2021 with English Translation (5 pages).

METHOD FOR CONTROLLING A TURBOMACHINE COMPRISING AN ELECTRIC MACHINE

CROSS-REFERENCE TO RELATED APPLICATION(S)

This patent application is national stage entry of and claims the benefit of priority to International Application No. PCT/FR2021/050347, filed on Mar. 2, 2021, which claims benefit to French Application No. FR2002447, filed on Mar. 12, 2020.

PRIOR ART

The present invention belongs to the general field of aeronautics and, in particular, that of turbomachines. It relates more particularly to a method for controlling a turbomachine, said turbomachine comprising a low-pressure spool and a high-pressure spool driven respectively by a low-pressure rotation shaft and a high-pressure rotation shaft, and at least one electric machine forming a device for injecting torque into/removing torque from one of said rotation shafts.

Figure 1:
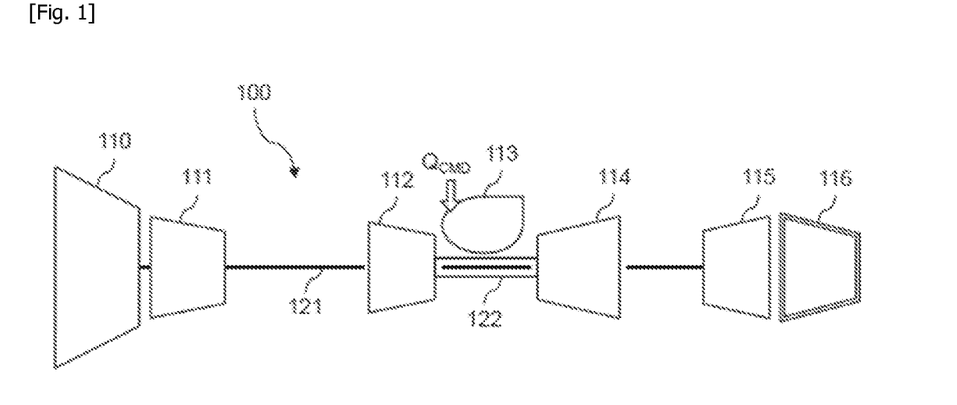
FIG. 1 shows, in schematic form, a turbomachine comprising a gas generator according to the prior art.

In reference to FIG. 1, a turbomachine 100 comprising a gas generator is shown schematically. More particularly, the example of FIG. 1 depicts a turbomachine 100 of the twin-spool turbofan engine type for an aircraft.

In a known manner, the turbomachine 100 comprises, from upstream to downstream in the direction of flow of the gases, a fan 110, a low-pressure compressor 111, a high-pressure compressor 112, a combustion chamber 113 which receives a fuel flow setpoint QCMD, a high-pressure turbine 114, a low-pressure turbine 115 and a primary exhaust nozzle 116. The low-pressure (or LP) compressor 111 and the low-pressure turbine 115 are connected by a low-pressure shaft 121 and together form a low-pressure spool. The high-pressure (or HP) compressor 112 and the high-pressure turbine 114 are connected by a high-pressure shaft 122 and together form, with the combustion chamber, a high-pressure spool. The fan 110, which is driven by the LP shaft 121, compresses the ingested air. This air divides, downstream of the fan 110, into a secondary air stream which is conveyed directly towards a secondary nozzle (not shown) through which it is ejected in order to contribute to the thrust provided by the turbomachine 100, and a stream referred to as the primary stream which enters the gas generator, constituted by the low-pressure spool and the high-pressure spool, and which is then ejected into the primary nozzle 116.

Conventionally, the fuel flow setpoint QCMD is determined as a function of a difference between the speed of the turbomachine and a setpoint speed which depends on a position of a control lever that can be operated by the pilot. To this end, a fuel control loop is implemented by a control device, generally integrated into the computer of the FADEC (Full Authority Digital Engine Control) equipping the turbomachine.

The fuel control loop is also intended to ensure that the flow of fuel injected into the combustion chamber, in the acceleration or deceleration phase (i.e., transient phase), does not exceed at least one given threshold value, referred to as the "operability limit", beyond which an engine malfunction may occur. In other words, said fuel control loop helps manage the controllability and the operability of the turbomachine 100.

"Operability" refers here, in a manner that is known per se, to the concept of ensuring the correct operation of the turbomachine 100. More particularly, it means ensuring that the operating line of the turbomachine 100 is kept within an authorised operating zone, so as not to exceed the limitations imposed by the physics of the components equipping the turbomachine 100.

As a non-limiting example, in order to operate the turbomachine 100 and, more particularly, its HP compressor 112, protection threshold values corresponding respectively to an acceleration limit and a deceleration limit are implemented. These operability limits are determined from limits relating to a ratio C/P between the flow of fuel C injected into the combustion chamber and the static pressure P measured at the inlet of the combustion chamber. These limits of the ratio C/P are fixed, in a manner that is known per se, in order to guard against surging during acceleration and engine shutdown during deceleration. In other words, these limits correspond to design constraints of the turbomachine 100 that need to be observed in order to ensure the operability of the engine.

Thus, the designer of a turbomachine must therefore attempt to optimise the placement of the operating line by placing it as high as possible, so as to benefit from better performances from its compressors, while keeping a sufficient distance (i.e., a margin) from the operability limits, in order to allow safe accelerations/decelerations.

Another constraint to be taken into account relates to the fact that the acceleration or deceleration time of an engine depends directly on the margin applied in relation to the operability limits. For example, when the pilot requests an acceleration of the engine speed, the current speed may not be able to follow the requested acceleration path, because the latter would require the acceleration limit to be exceeded, which would result in surging. Therefore, in this case, the current speed increases slowly, with a delay, in order to protect the turbomachine.

In order to improve the response time of a turbomachine during a transient phase, while limiting the impact of the design constraints linked to the operability limits, it has been proposed, in particular, that the turbomachine 100 be hybridised by equipping it with an electric machine. Such an electric machine is configured to inject torque into and/or remove torque from one of the rotation shafts respectively associated with the low-pressure and high-pressure spools.

Document WO2016/020618 describes an implementation in which such an electric machine is used. However, it remains unclear how the electric machine is controlled in this implementation. In particular, no explicit and reproducible strategy is proposed for controlling the electric machine in order to optimise the operation and the operability of the turbomachine.

DISCLOSURE OF THE INVENTION

The aim of the present invention is to partially or completely overcome the disadvantages of the prior art, in particular those disclosed above, by proposing a solution that makes it possible to effectively regulate a torque generated by at least one electric machine equipping a hybridised turbomachine, so as to obtain an excellent response time from the turbomachine, an improvement in the operability of same and a limitation in the power consumption of said at least one electric machine.

To this end, and according to a first aspect, the invention relates to a method for controlling a turbomachine comprising a gas generator comprising a combustion chamber, a low-pressure rotation shaft and a high-pressure rotation shaft, the turbomachine comprising at least one electric machine forming a device for injecting torque into/removing torque from one of said rotation shafts. Furthermore, said method comprises a step of implementing a fuel control loop in order to determine a fuel flow setpoint into the combustion chamber, and comprising:

monitoring the turbomachine in order to detect if at least one operability limit of said turbomachine is reached,
if said at least one operability limit is reached, determining a corrected fuel flow setpoint, said corrected fuel flow setpoint exhibiting a difference, referred to as the "flow difference", in relation to the current fuel flow setpoint.

Said method also comprises a step of implementing a torque control loop in order to determine a torque setpoint for said at least one electric machine, and comprising determining a torque correction quantity as a function of said flow difference, said torque setpoint being determined as a function of said torque correction quantity.

Therefore, according to said control method, the torque control loop can act together with the fuel flow control loop when the control offered by the latter is limited, for example due to potential surging or shutdown phenomena. The torque control loop therefore makes it possible to relax the margin applied in relation to the design constraints of the turbomachine. The operability of the turbomachine is thus improved.

For example, in the event of surging and shutdown phenomena, the torque control loop advantageously allows the surging and shutdown limits of the turbomachine to be moved apart in order to allow better control of the fuel setpoint.

Advantageously, the torque control loop does not replace the fuel flow control loop but supports it when the operating limits are reached, i.e., when one or more operability limits are reached. The fundamentals of the speed control are therefore not disrupted, which ensures reliable control and therefore, ultimately, a far better response time of the turbomachine in comparison with the solutions of the prior art.

Moreover, said control method differs in a remarkable manner from the prior art in that the torque correction quantity is determined as a function of the flow difference. Indeed, such arrangements are particularly advantageous because they allow the physical reality of the turbomachine to be taken into consideration, in particular its operation, irrespective of the speed (transient or indeed stabilised).

"Physical reality" refers here to the fact that the operation of said at least one electric machine is linked to the actual variation in fuel flow. In other words, the thermodynamic aspects involved in the variation in fuel flow are taken into consideration when determining the quantity.

In specific implementations, the control method may further comprise one or more of the following features, considered individually or according to all technically possible combinations.

In specific implementations, the torque correction quantity is determined to be equal to:

$$\frac{EC\_DEB \times FHV \times \eta}{C\_1 \times N}$$

expression in which:
EC_DEB corresponds to the flow difference,
FHV corresponds to the calorific value of the fuel,
N corresponds to the speed of rotation of the rotation shaft into/from which torque is injected/removed by said at least one electric machine (ME),
C_1 is a constant value,
η corresponds to the thermal efficiency of the gas generator.

Such an expression, established by the inventors, is particularly remarkable in that it allows the torque correction quantity to be determined in a simple, fast and inexpensive manner. Furthermore, the generic nature of this expression makes it possible to consider applying the invention to any type of industrial machine equipped with a turbomachine according to the invention.

In specific implementations, the efficiency η of the gas generator is expressed in the following form:

$$\eta = 1 - \frac{1}{\left(1 + \frac{\gamma-1}{2} \times M_0^2\right) \times OPR^{\frac{\gamma-1}{\gamma}}}$$

expression in which:
M corresponds to the Mach speed,
γ corresponds to a ratio between an isobaric heat capacity and an isochoric heat capacity,
OPR corresponds to an overall pressure rate of the gas generator.

In specific implementations, the torque correction quantity is determined according to the following expression:

$$\frac{EC\_DEB \times FHV}{C'\_1 \times N}$$

expression in which:
EC_DEB corresponds to the flow difference,
FHV corresponds to the calorific value of the fuel,
N corresponds to the speed of rotation of the rotation shaft into/from which torque is injected/removed by said at least one electric machine (ME),
C'_1 is a constant value.

Such an expression of the torque correction quantity is particularly simple to calculate insofar as the efficiency is considered to be constant, which can be justified by the fact that the fluctuations in said efficiency η are minor except when idling.

In specific implementations, said at least one operability limit corresponds to any one of the following parameters:
a C/P limit,
a limit relative to a mechanical speed N1,
a limit relative to a mechanical speed N2,
a limit relative to an exhaust gas temperature at the inlet of a low-pressure turbine of the turbomachine.

According to another aspect, the invention relates to a system for controlling a turbomachine comprising a gas generator comprising a combustion chamber, a low-pressure rotation shaft and a high-pressure rotation shaft, the turbomachine comprising at least one electric machine forming a device for injecting torque into/removing torque from one of said rotation shafts. Furthermore, said control system comprises a fuel control loop for determining a fuel flow setpoint into the combustion chamber, said fuel control loop comprising:
a module for monitoring the turbomachine, configured to detect if at least one operability limit of said turbomachine is reached, a determination module, configured to determine a corrected fuel flow setpoint if said at least one operability limit is reached, said corrected fuel flow setpoint exhibiting a difference, referred to as the "flow difference", in relation to the current fuel flow setpoint.

Said control system also comprises a torque control loop for determining a torque setpoint for said at least one electric machine, said torque control loop comprising:

a first determination module, configured to determine a torque correction quantity as a function of said flow difference, a second determination module, configured to determine said torque setpoint as a function of said torque correction quantity.

According to another aspect, the invention relates to a turbomachine comprising a gas generator comprising a combustion chamber, a low-pressure rotation shaft and a high-pressure rotation shaft, the turbomachine comprising at least one electric machine forming a device for injecting torque into/removing torque from at least one of said rotation shafts and a control system according to the invention.

According to another aspect, the invention relates to an aircraft comprising a turbomachine according to the invention.

BRIEF DESCRIPTION OF THE DRAWINGS

Other features and advantages of the present invention will become clearer on reading the description below, with reference to the appended drawings which illustrate one non-limiting exemplary embodiment of the invention. In the figures.

DESCRIPTION OF THE EMBODIMENTS

The present invention belongs to the field of regulating (i.e., controlling) the operation of a turbomachine comprising a gas generator.

Hereinafter in the description, a turbomachine of the twin-spool turbofan engine type for an aircraft, for example such as a civil aircraft capable of carrying passengers, is considered, in a non-limiting manner. However, it should be noted that the invention remains applicable regardless of the type of turbomachine considered, provided it comprises a gas generator. For example, a turboshaft engine, a by-pass engine, etc., may be considered.

Furthermore, the invention also remains applicable to any type of aircraft (aeroplane, helicopter, etc.), and, more broadly, to any type of industrial machine equipped with a turbomachine according to the invention.

Figure 2:
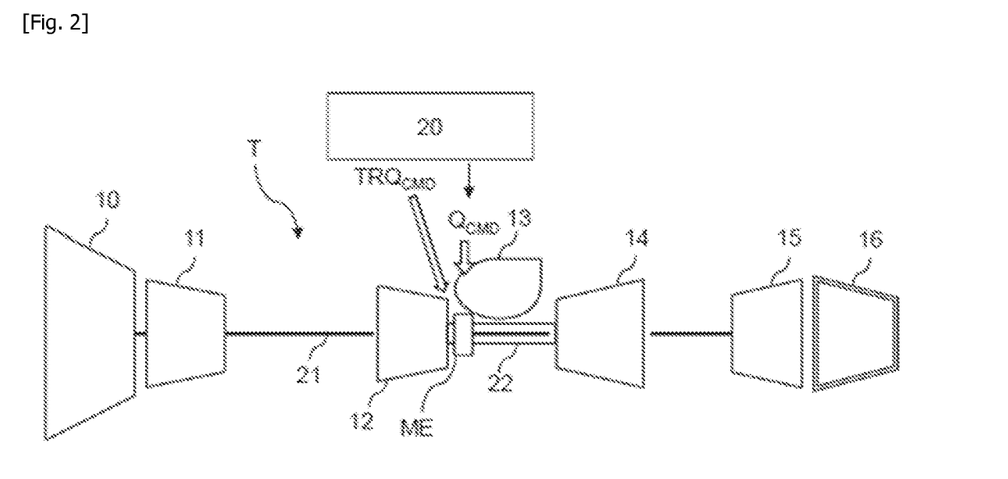
FIG. 2 shows, in schematic form, in its environment, one embodiment of a turbomachine according to the invention.

FIG. 2 shows, in schematic form, in its environment, one embodiment of a turbomachine T according to the invention.

The turbomachine T has a general configuration at least according to the prior art. As a non-limiting example, such a general configuration is described above in reference to FIG. 1.

Thus, the turbomachine T comprises, from upstream to downstream in the direction of flow of the gases, a fan 10, a low-pressure compressor 11, a high-pressure compressor 12, a combustion chamber 13 which receives a fuel flow setpoint QCMD, a high-pressure turbine 14, a low-pressure turbine 15 and a primary exhaust nozzle 16. The low-pressure (or LP) compressor 11 and the low-pressure turbine 15 are connected by a low-pressure shaft 21 and together form a low-pressure spool. The high-pressure (or HP) compressor 12 and the high-pressure turbine 14 are connected by a high-pressure shaft 22 and together form, with the combustion chamber, a high-pressure spool. The fan 10, which is driven by the LP shaft 21, compresses the ingested air. This air divides, downstream of the fan 10, into a secondary air stream which is conveyed directly towards a secondary nozzle (not shown) through which it is ejected in order to contribute to the thrust provided by the turbomachine T, and a stream referred to as the primary stream which enters the gas generator, constituted by the low-pressure spool and the high-pressure spool, and which is then ejected into the primary nozzle 16.

In a known manner, the operation of the turbomachine T is controlled by a Full Authority Digital Engine Control, referred to as a FADEC 20. Furthermore, in order to modify the speed of the turbomachine T, the pilot of the aircraft modifies the position of a control lever, which has the effect of modifying the fuel flow setpoint QCMD into the combustion chamber 13.

The turbomachine T according to the invention also comprises at least one electric machine ME. As is conventional, said at least one electric machine ME forms a device for injecting torque into/removing torque from one of said rotation shafts. The torque generated by the electric machine ME is generated by it on receipt of a torque setpoint TRQCMD, as set out in detail below.

Hereinafter in the description, and as shown by FIG. 2, it is considered in a non-limiting manner that the turbomachine T comprises a single electric machine ME and that the rotation shaft into/from which torque is injected/removed by virtue of the electric machine ME is the high-pressure shaft 22. However, it is also quite possible to consider that the rotation shaft on which this single electric machine ME acts is the low-pressure shaft 21. It is also quite possible to consider that the turbomachine T comprises a plurality of electric machines T capable of injecting torque into and/or removing torque from a single one of said shafts or indeed into/from separate shafts.

Thus, the electric machine ME is configured, according to a first operating mode, to generate torque suitable for driving the high-pressure shaft 22. In a conventional manner, such a first operating mode corresponds to an "traction operating mode". The electric machine ME is moreover configured, according to a second operating mode, to generate torque suitable for removing mechanical energy from the high-pressure shaft 22, this removed energy being capable of being used, for example, for the purpose of powering at least one electric device of the turbomachine T, such as the Full Authority Digital Engine Control or FADEC, for example. Once again, in a conventional manner, such a second operating mode corresponds to a "generator operating mode".

A person skilled in the art may refer to document WO2016/020618 with regard to the production and implementation of such an electric machine ME for a turbomachine, these aspects therefore not being described in any further detail here.

According to the invention, the turbomachine T also comprises a control system SYS_C comprising a fuel setpoint QCMD control loop, referred to as the "first loop B1", and a torque setpoint TRQCMD control loop, referred to as the "second loop B2". Said first loop B1 and second loop B2 are implemented, according to the invention, according to a control method set out in detail below.

In the present embodiment, said control system SYS_C is integrated into the FADEC 20, and more particularly into the computer of the latter. However, no restriction is applied to the location of said control system SYS_C within the turbomachine T, provided that it is able to implement control of said turbomachine T via said two control loops B1 and B2.

Hereinafter in the description, it is considered in a non-limiting manner that the control loops B1 and B2 are integrated into a single entity which forms a control device with which said control system SYS_C is combined. However, according to other examples not detailed here, it is also quite possible to consider that the first loop B1 and the second loop B2 are integrated respectively into a first control device and a second control device, these devices themselves being integrated into the control system SYS_C.

Figure 3:
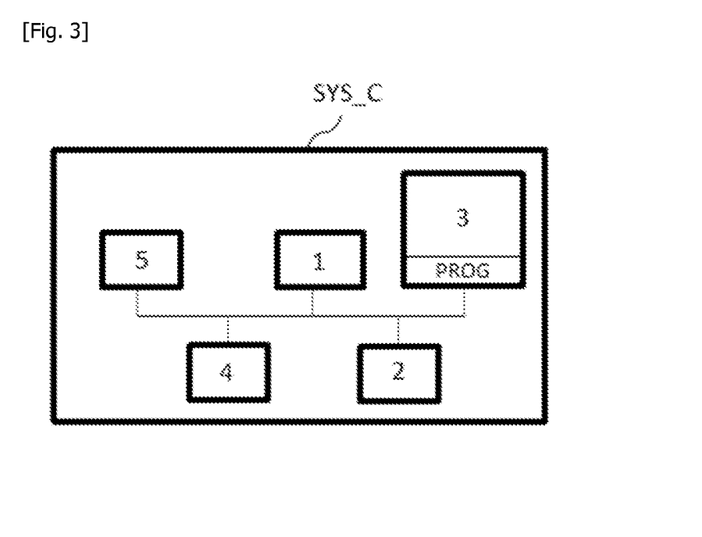
FIG. 3 shows an example of hardware architecture of a control system according to the invention belonging to the turbomachine of FIG. 2.

FIG. 3 shows, in schematic form, an example of hardware architecture of the control system SYS_C according to the invention.

As shown by FIG. 3, the control system SYS_C according to the invention is provided with the hardware architecture of a computer. Therefore, said control system SYS_C comprises, in particular, a processor 1, a random-access memory 2, a read only memory 3 and a non-volatile memory 4. It is also provided with communication means 5.

The communication means 5 allow the control system SYS_C, in particular, to send the torque setpoint TRQCMD to the electric machine ME, the latter therefore being equipped with communication means configured to receive said torque setpoint TRQCMD. The communication means 5 also allow the control system SYS_C to receive measurements of physical quantities acquired by acquisition means equipping the turbomachine T. The communication means 5 comprise, for example, a computer data bus suitable for transmitting said setpoints and said measurements of physical quantities. According to another example, the communication means 5 comprise a wired or wireless communication interface capable of implementing any suitable protocol known to a person skilled in the art (Ethernet, Wi-Fi, Bluetooth, 3G, 4G, 5G, etc.).

Said measurements of physical quantities correspond, for example, to measurements of pressure, shaft rotation speed, aircraft speed. Moreover, the acquisition means configured to acquire said measurements comprise, in a known manner, an acquisition chain comprising a sensor dedicated to measuring each of said quantities. Generally, the configuration of such acquisition means is well known to a person skilled in the art and is therefore not described in any further detail here. Furthermore, a person skilled in the art is also able to determine which physical quantities need to be measured in order to be able to perform the control method according to the invention, in view of the implementations described hereinafter for the control method according to the invention.

The read only memory 3 of the control system SYS_C constitutes a recording medium according to the invention, readable by the processor and on which a computer program PROG according to the invention is saved, comprising instructions for carrying out the steps of the control method according to the invention. The program PROG defines functional modules of the first control loop B1 and the second control loop B2, which rely on or control the previously cited hardware elements 2 to 5 of said control system SYS_C.

Thus, the first loop B1 comprises, in particular:
- a monitoring module MOD_B1_SUR for monitoring the turbomachine T, configured to detect if at least one operability limit of said turbomachine T is reached,
- a determination module MOD_B1_DET, configured to determine a corrected fuel flow setpoint QCMD_CORREC if said at least one operability limit is reached, said corrected fuel flow setpoint QCMD_CORREC exhibiting a difference, referred to as the "flow difference" EC_DEB, in relation to the current fuel flow setpoint.

"Current fuel flow setpoint" refers here to the fuel flow setpoint QCMD that is applicable before a correction is determined as a result of said at least one operability limit being reached.

It should be noted that the means configured by software and/or hardware to implement the first loop B1 are well known to a person skilled in the art, and are therefore not described in any further detail here. As a non-limiting example, document FR2977638A1 describes these aspects in the context of controlling fuel flow to prevent surging, or, in other words, when the operability limit in question is a C/P limit.

The second loop B2, comprises:
- a first determination module MOD_B2_DET1, configured to determine a torque correction quantity ΔTRQ as a function of said flow difference EC_DEB,
- a second determination module MOD_B2_DET2, configured to determine said torque setpoint TRQCMD as a function of said torque correction quantity ΔTRQ.*

The way in which the torque correction quantity ΔTRQ is determined by the first determination module MOD_B2_DET1 is set out in detail below by means of several implementations of the control method according to the invention.

Hereinafter in the description, and in order to simplify the latter, a single operability limit is considered, corresponding to the C/P acceleration limit, which is well known to a person skilled in the art.

However, it should be noted that choosing an operability limit corresponding to said acceleration limit is only one implementation variant of the invention. Other choices are possible, such as, for example: a C/P deceleration limit, a limit relative to a mechanical speed N1, a limit relative to a mechanical speed N2, a limit relative to an exhaust gas temperature (also referred to as EGT) at the inlet of the low-pressure turbine 15 of the turbomachine, etc.

Moreover, it should also be noted that no restriction is applied to the number of limits that may be considered within the meaning of the invention. Therefore, the invention applies equally when a single operability limit is considered or indeed when several operability limits are considered, some or all of the latter possibly also being of different respective types. A person skilled in the art knows how to implement the invention when several operability limits are considered.

Figure 4:
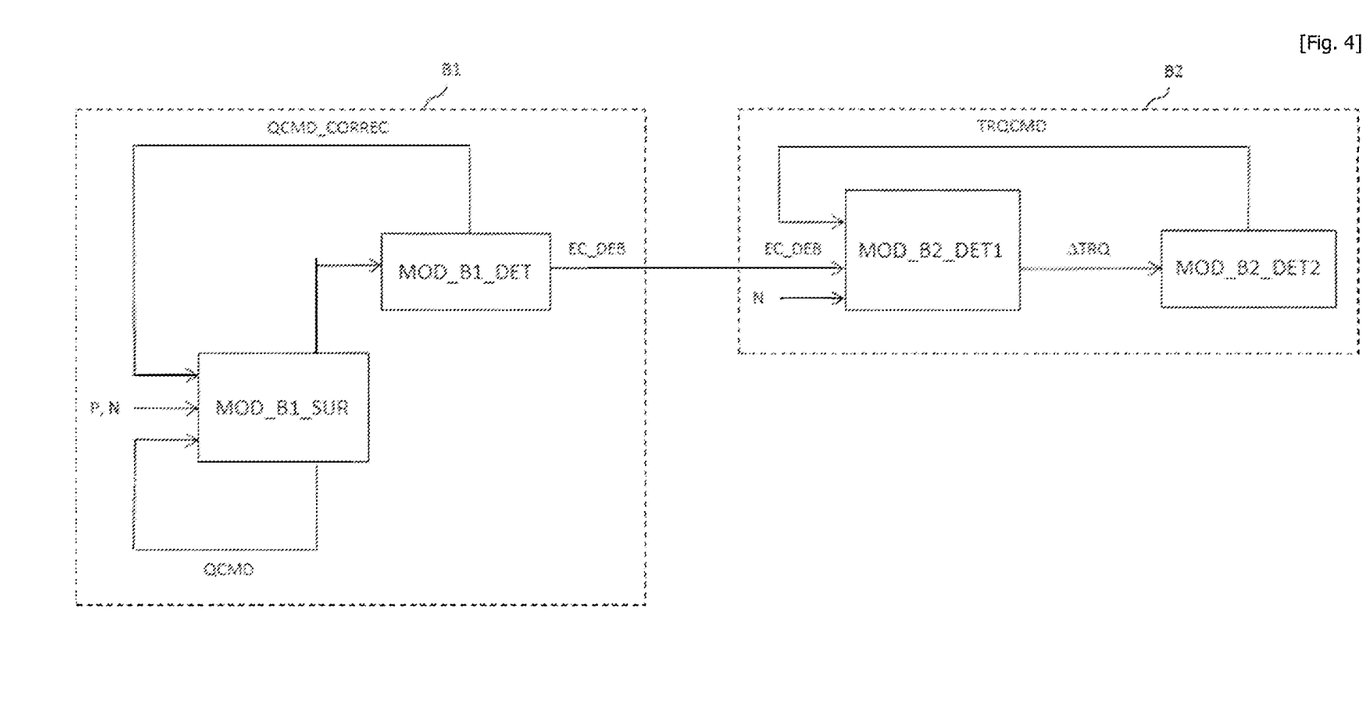
FIG. 4 shows, in schematic form, an example of the operation of two control loops according to the invention, a fuel flow control loop B1 and a torque control loop B2, said loops B1, B2 belonging to the control system of FIG. 3.

FIG. 4 shows, in schematic form, an example of the operation of the loops B1 and B2.

As shown by FIG. 4, the monitoring module MOD_B1_SUR accepts as input the fuel setpoint which corresponds to the current fuel flow setpoint QCMD if said C/P acceleration limit is not reached or indeed to the fuel flow setpoint QCMD_CORREC if said C/P acceleration limit is reached. The monitoring module MOD_B1_SUR also accepts, as input, pressure measurements that are appropriate in order to be able to determine whether not said C/P acceleration limit is reached, in particular including the pressure P at the outlet of the high-pressure compressor 12.

As is conventional, the monitoring module MOD_B1_SUR also accepts as input an indicator corresponding to the speed N of rotation of the rotation shaft into/from which torque is injected/removed by the electric machine ME. In the present embodiment, this indicator corresponds to the speed NHP of rotation of the high-pressure shaft 22. It is in particular known that the speed indicator accepted by the monitoring module MOD_B1_SUR is used by the latter in order to determine if there is an intention to enter a transient phase.

The determination module MOD_B1_DET accepts as input a signal (not shown in the figures) from the monitoring module MOD_B1_SUR when the C/P acceleration limit is reached. The determination module MOD_B1_DET also accepts, as input, pressure and temperature measurements that are appropriate in order to be able to determine the corrected setpoint QCMD_CORREC.

Given that the operability limit considered in this instance is the C/P acceleration limit, the pressure and temperature measurements accepted as input by the determination module MOD_B1_DET comprise a pressure measurement PS3 corresponding to the static pressure of the high-pressure compressor 12, a temperature measurement T25 corresponding to the total temperature at the inlet of the high-pressure compressor 12 and a temperature measurement Tstd corresponding to the standard temperature at sea level (i.e., equal to 288.15 K (Kelvin) or 15° C. (Celsius)). Using these measurements, the determination module MOD_B1_DET determines the corrected setpoint QCMD_CORREC in a manner that is known per se, according to the following expression:

$$QCMD\_CORREC = \frac{C}{P} \times PS3 \times \sqrt{\frac{T25}{Tstd}}.$$

It should be noted that, as an alternative to this exemplary embodiment, the various measurements PS3, T25 and Tstd may all be accepted as input in the monitoring module MOD_B1_SUR and then transmitted to the determination module MOD_B1_DET.

Moreover, in this exemplary embodiment, it is envisaged that the corrected setpoint QCMD_CORREC be determined via the calculation of the expression provided above. However, it is also quite possible to consider determining this corrected setpoint QCMD_CORREC by consulting a tabulation, i.e., a table comprising a set of values taken by a function whose analytical formulation corresponds to said expression provided above.

In a manner that is known per se, a fuel flow correction command may then be generated by the FADEC based on said corrected setpoint QCMD_CORREC which is redirected to the input of the monitoring module MOD_B1_SUR in order to close the first loop B1.

Moreover, as shown by FIG. 4, the first determination module MOD_B2_DET1 accepts as input the flow difference EC_DEB determined by the determination module MOD_B1_DET (the flow difference EC_DEB is conventionally determined by subtracting the corrected setpoint QCMD_CORREC from the current setpoint QCMD). The first determination module MOD_B2_DET1 also accepts as input the speed indicator provided as input to the monitoring module MOD_B1_SUR, namely the speed NHP in the present embodiment.

In more particular exemplary embodiments, the first determination module MOD_B2_DET1 may receive as input other measurements and/or indicators in order to be able to carry out different implementations of the control method according to the invention, these implementations being set out in detail below. In any case, a person skilled in the art knows how to determine which measurements and/or which indicators the first determination module MOD_B2_DET1 may receive as input in order to allow said implementations to be carried out.

Based on the inputs provided to it, the first determination module MOD_B2_DET1 determines the torque correction quantity ΔTRQ which is transmitted to the second determination module MOD_B2_DET2. Therefore, said second determination module MOD_B2_DET2 determines the torque setpoint TRQCMD in a manner that is known per se as a function of the torque correction quantity ΔTRQ.

In a manner that is known per se, a torque command may then be generated by the FADEC on the basis of said torque setpoint TRQCMD. This torque setpoint TRQCMD is then redirected in order to close the loop B2. For example, and as shown by FIG. 4, the setpoint TRQCMD is redirected to the input of the first determination module MOD_B2_DET1 which may itself then transmit it to the second determination module MOD_B2_DET2. As an alternative, the setpoint TRQCMD is redirected to the input of the second determination module MOD_B2_DET2.

Figure 5:
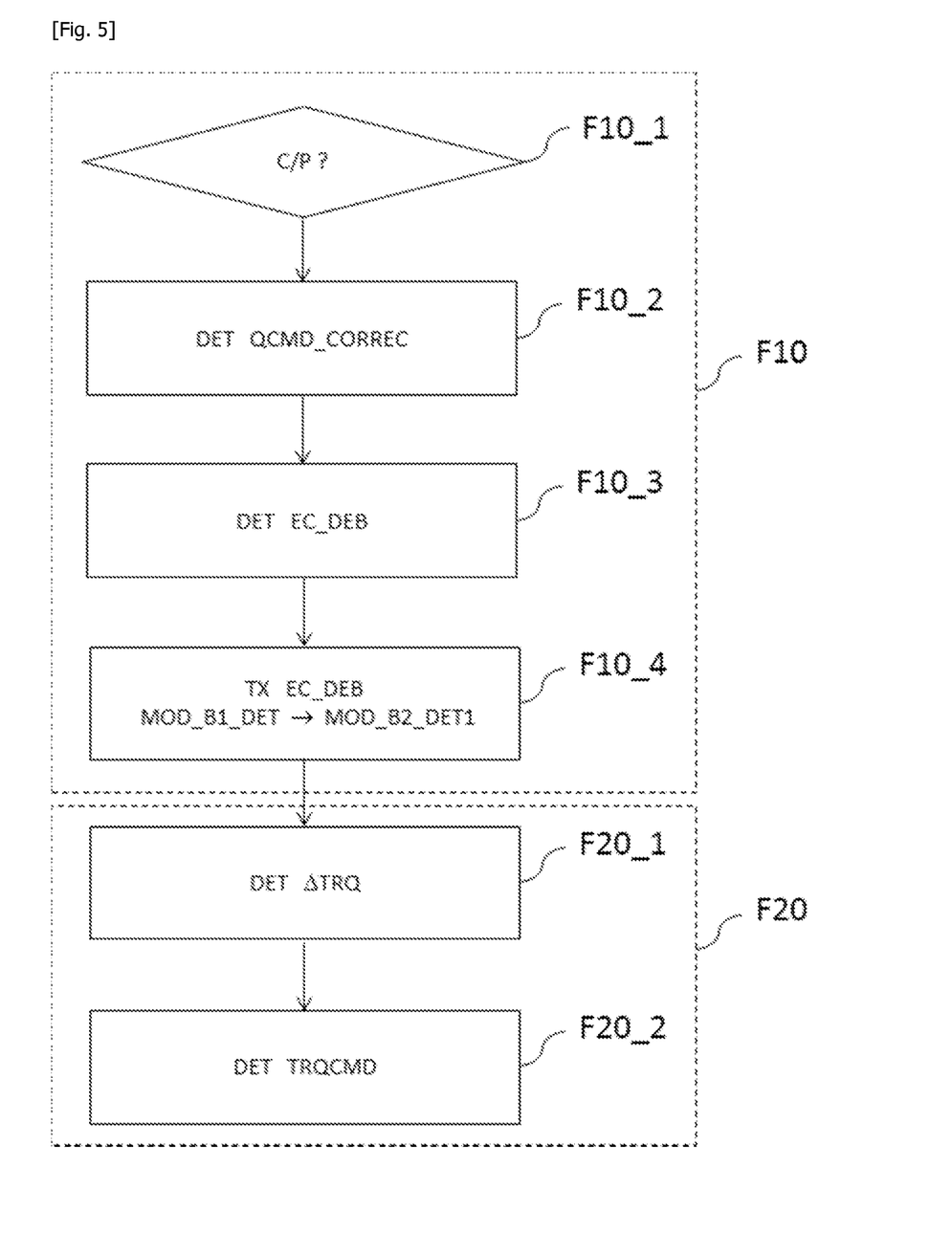
FIG. 5 shows, in the form of a flowchart, the main steps of a control method according to the invention.

FIG. 5 shows, in the form of a flowchart, the main steps of the control method according to the invention, as they are implemented by the control system SYS_C.

As shown by FIG. 5, the control method first comprises a step F10 of implementing the first loop B1.

This step F10 first comprises a sub-step F10_1 of monitoring the turbomachine T. This monitoring sub-step F10_1 is implemented by the monitoring module MOD_B1_SUR of the first loop B1.

If the C/P acceleration limit is reached, the control method, and more particularly the step F10 of implementing the loop B1, comprises a sub-step F10_2 of determining the corrected setpoint QCMD_CORREC, whose difference with respect to the current flow setpoint QCDM is represented by said flow difference EC_DEB. This determination sub-step F10_2 is implemented by the determination module MOD_B1_DET of the first loop B1.

As previously mentioned, in reference to FIG. 4, said sub-step F10_2 is carried out following the transmission of a signal from the monitoring module MOD_B1_SUR to the determination module MOD_B1_DET, this signal conveying, in a manner that is known per se, an item of information representative of the fact that said C/P acceleration limit is reached.

Naturally, it should be noted that, if the C/P acceleration limit is not reached, said sub-step F10_2 is not carried out, meaning that the current setpoint QCMD is not modified.

Once the corrected setpoint QCMD_CORREC has been determined, the determination module MOD_B1_DET also determines the flow difference EC_DEB (sub-step F10_3) which is transmitted (sub-step F10_4) to the first determination module MOD_B2_DET1 of the second loop B2.

Said control method also comprises a step F20 of implementing the second loop B2. This step F20 follows the implementation of the step F10 associated with the first loop B1. In other words, it should be noted that the implementation of the second loop B2 relies on the first loop B1, as can be seen clearly from the elements mentioned in reference to FIG. 4.

This step F20 first comprises a sub-step F20_1 of determining the torque correction quantity ΔTRQ as a function of the flow difference EC_DEB. This step F20_1 is implemented by the first determination module MOD_B2_DET1 of the second loop B2.

The fact that the torque correction quantity ΔTRQ is determined as a function of the flow difference EC_DEB is particularly advantageous because it allows the physical reality of the turbomachine T to be taken into consideration, in particular its operation, irrespective of the speed (transient or indeed stabilised). "Physical reality" refers here to the fact that the operation of the electric machine ME is related to the actual variation in fuel flow. In other words, the thermodynamic aspects involved in the variation in fuel flow are taken into consideration when determining the quantity ΔTRQ.

In one specific implementation, the torque correction quantity ΔTRQ is determined according to the following expression:

$$\Delta TRQ = \frac{EC\_DEB \times FHV \times \eta}{C\_1 \times NHP}$$

expression in which:
FHV corresponds to the calorific value of the fuel (expressed in J·kg$^{-1}$),
C_1 is a constant value,
η corresponds to the thermal efficiency of the gas generator.

Naturally, it is understood that, in this implementation, the first determination module MOD_B2_DET1 accepts as input the measurements/indicators EC_DEB, FHV, η, C_1, NHP in order to calculate the quantity ΔTRQ.

Such an expression, established by the inventors, is particularly remarkable in that it allows the quantity ΔTRQ to be determined in a simple, fast and inexpensive manner.

In order to obtain this expression, it is first necessary to consider that the total power PW_CORE available at the outlet of the gas generator can be calculated according to the following expression:

$$PW\_CORE = W \times \left(\Delta h\_CORE\_EXIT - \frac{1}{2} \times V_0^2\right) + PW\_OFF\_TAKE$$

expression in which:
W corresponds to the air flow at the inlet of the high-pressure spool (expressed in kg·s$^{-1}$),
Δh_CORE_EXIT corresponds to the enthalpy available to generate work at the outlet of the gas generator (expressed in J·kg$^{-1}$),
$V_0$ corresponds to flight speed,
PW_OFF_TAKE corresponds to the power extracted in the form of air and/or mechanical energy removed from the high-pressure spool.

Therefore, the power generated by the gas generator can be correlated with the chemical power linked to the use of the fuel according to the following expression:

$$Wff = \frac{1}{FHV \times \eta} \times PW\_CORE$$

expression in which Wff corresponds to the fuel flow (expressed in kg·s$^{-1}$).

The variation in fuel flow ΔWff can then be correlated with the variation in power ΔP_ME of the electric machine ME according to the following expression:

$$\Delta Wff = \frac{C\_2}{FHV \times \eta} \times \Delta P\_ME$$

the constant value C_2 being introduced here in order to allow the values of ΔWff provided by this formula to be adjusted with values obtained according to another method, for example by virtue of tests carried out on a test bench or indeed by virtue of digital simulations.

It is possible to deduce, from this latter expression giving ΔWff, the expression of ΔTRQ, given that the variation in power ΔP_ME of the electric machine ME is equal to the product of ΔTRQ and the speed of rotation of the high-pressure shaft 22, this speed being expressed conventionally as a function of NHP.

It should be noted that, in the expressions set out above, the variation in fuel flow ΔWff corresponds precisely to the flow difference EC_DEB.

The efficiency η of the gas generator can be expressed differently. For example, said efficiency η is expressed in the following form:

$$\eta = 1 - \frac{1}{\left(1 + \frac{\gamma - 1}{2} \times M_0^2\right) \times OPR^{\frac{\gamma-1}{\gamma}}}$$

expression in which:
$M_0$ corresponds to the Mach speed,
γ corresponds, in a manner that is known per se, to a ratio between an isobaric heat capacity and an isochoric heat capacity,
OPR corresponds to an overall pressure rate of the gas generator.

The choice according to which the efficiency η is expressed according to the formula given above is only one implementation variant of the invention. Other variants may be envisaged, for example considering that the parameter OPR is replaced by a temperature ratio T3/T2 in which T3 and T2 correspond respectively to the outlet temperature of the high-pressure spool and to the inlet temperature of the primary stream.

It is also quite possible to consider a constant efficiency η, in particular because the fluctuations in said efficiency η are minor except when idling. To this end, in another specific implementation, the torque correction quantity ΔTRQ is determined according to the following expression:

$$\Delta TRQ = \frac{EC\_DEB \times FHV}{C'\_1 \times NHP}$$

expression in which C'_1 is a constant value.

Thus, said constant C'_1 includes not only the previously mentioned constant C_1 but also the value of the efficiency η considered in this instance to be constant.

The control method then comprises a sub-step F20_2 of determining the torque setpoint TRQCMD as a function of said torque correction quantity ΔTRQ. This determination sub-step F20_2 is implemented by the second determination module MOD_B2_DET2 of the second loop B2.

The determination of said torque setpoint TRQCMD is carried out in a manner that is known per se. In particular, a previous torque setpoint observed before the determination of the torque correction quantity ΔTRQ may be taken into account, meaning that the newly determined torque setpoint TRQCMD corresponds to the old torque setpoint to which said torque correction quantity ΔTRQ is applied.

The invention claimed is:

1. A method for controlling a turbomachine comprising a gas generator comprising a combustion chamber, a low-pressure rotation shaft and a high-pressure rotation shaft, the turbomachine comprising at least one electric machine forming a device for injecting torque into/removing torque from one of said rotation shafts, said method comprising a step of implementing a fuel control loop in order to determine a fuel flow setpoint into the combustion chamber, and comprising:
   monitoring the turbomachine in order to detect if at least one operability limit of said turbomachine is reached,
   if said at least one operability limit is reached, determining a corrected fuel flow setpoint, said corrected fuel flow setpoint exhibiting a difference, referred to as the "flow difference", in relation to the current fuel flow setpoint,
said method also comprising a step of implementing a torque control loop in order to determine a torque setpoint for said at least one electric machine, and comprising determining a torque correction quantity as a function of said flow difference, said torque setpoint being determined as a function of said torque correction quantity wherein the torque correction quantity is determined to be equal to:

$$\frac{EC\_DEB \times FHV \times \eta}{C\_1 \times N}$$

expression in which:
EC_DEB corresponds to the flow difference,
FHV corresponds to the calorific value of the fuel,
N corresponds to the speed of rotation of the rotation shaft into/from which torque is injected/removed by said at least one electric machine,
C_1 is a constant value, and
n corresponds to the efficiency of the gas generator.

2. The method as claimed in claim 1, in which the efficiency q of the gas generator is expressed in the following form:

$$\eta = 1 - \frac{1}{\left(1 + \frac{\gamma-1}{2} \times M_0^2\right) \times OPR^{\frac{\gamma-1}{\gamma}}}$$

expression in which:
M corresponds to the Mach speed,
y corresponds to a ratio between an isobaric heat capacity and an isochoric heat capacity,
OPR corresponds to an overall pressure rate of the gas generator.

3. The method as claimed in claim 1, in which said at least one operability limit corresponds to any one of the following parameters:
   a C/P limit,
   a limit relative to a mechanical speed N1,
   a limit relative to a mechanical speed N2,
   a limit relative to an exhaust gas temperature at the inlet of a low-pressure turbine of the turbomachine.

4. A non-transitory computer-readable medium having stored thereon instructions which, when executed by a processor, cause the processor to implement the method of claim 1.

5. A control system—for controlling a turbomachine—comprising a gas generator comprising a combustion chamber, a low-pressure rotation shaft and a high-pressure rotation shaft, the turbomachine comprising at least one electric machine forming a device for injecting torque into/removing torque from one of said rotation shafts, said control system comprising a fuel control loop for determining a fuel flow setpoint into the combustion chamber, said fuel control loop comprising:
   a monitoring module for monitoring the turbomachine, configured to detect if at least one operability limit of said turbomachine is reached,
   a determination module, configured to determine a corrected fuel flow setpoint if said at least one operability limit is reached, said corrected fuel flow setpoint exhibiting a difference, referred to as the "flow difference", in relation to the current fuel flow setpoint, said control system also comprising a torque control loop for determining a torque setpoint for said at least one electric machine, said torque control loop comprising:
   a first determination module, configured to determine a torque correction quantity as a function of said flow difference,
   a second determination module, configured to determine said torque setpoint as a function of said torque correction quantity
   wherein the torque correction quantity—is determined to be equal to:

$$\frac{EC\_DEB \times FHV \times \eta}{C\_1 \times N}$$

expression in which:
EC_DEB corresponds to the flow difference,
FHV corresponds to the calorific value of the fuel,
N corresponds to the speed of rotation of the rotation shaft into/from which torque is injected/removed by said at least one electric machine,
C_1 is a constant value, and
n corresponds to the efficiency of the gas generator.

6. A turbomachine comprising a gas generator comprising a combustion chamber, a low-pressure rotation shaft and a high-pressure rotation shaft, the turbomachine comprising at least one electric machine-forming a device for injecting torque into/removing torque from at least one of said rotation shafts and a control system as claimed in claim 5.

7. An aircraft comprising a turbomachine as claimed in claim 6.

* * * * *